April 5, 1949.  R. M. STRIEGEL  2,466,128
ELECTRICAL EXTENSION CORD ASSEMBLY
Filed March 10, 1947
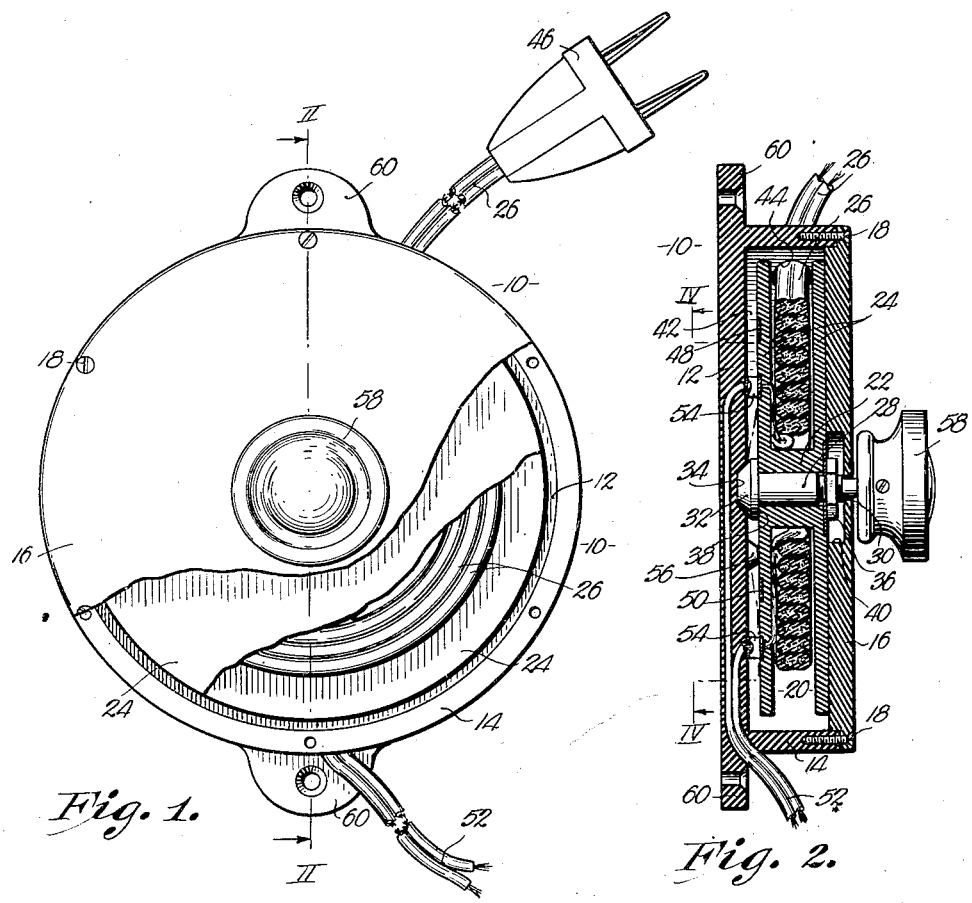
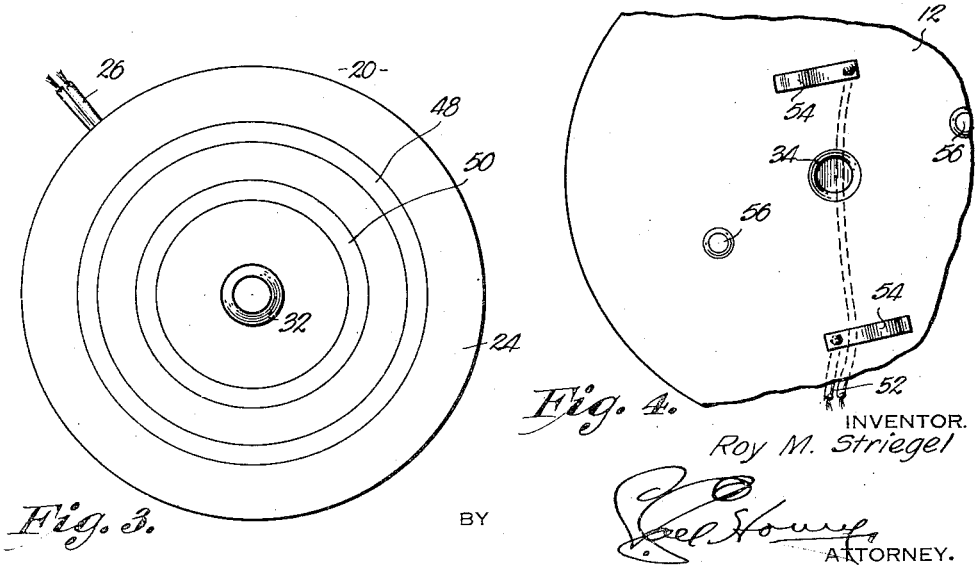
INVENTOR.
Roy M. Striegel
BY
ATTORNEY.

Patented Apr. 5, 1949

2,466,128

UNITED STATES PATENT OFFICE 2,466,128

ELECTRICAL EXTENSION CORD ASSEMBLY

Roy M. Striegel, Kansas City, Mo.

Application March 10, 1947, Serial No. 733,510

1 Claim. (Cl. 191—12.4)

This invention relates generally to the field of electrical fixtures and more specifically with an assembly for receiving an electrical cord or the like and adapted to permit extending the cord to any desired length where the same may be connected to an electrical appliance.

The primary object of this invention is to provide an electrical extension cord assembly having a rotatable reel mounted within a hollow body for receiving the extension cord in wound relation therewith and means interposed between the rotatable reel and the body for making continuous electrical contact with lead lines connected to a source of electrical energy irrespective of the relative position of the reel within the body.

An important object of this invention is to provide an electrical extension cord assembly having the aforesaid reel rotatably mounted within a hollow body wherein said reel is formed by a pair of spaced apart discs integral with a hub for receiving the extension cord wound about the hub and held against entanglement and other displacement between said discs.

A further object of this invention is to provide means in an electrical extension cord assembly for frictionally holding the rotatable reel against rotation within the body except upon application of manual rotative force thereto, said means serving to maintain a portion of the reel spaced from one wall of the body for receiving the aforesaid continuous electrical connection between the extension cord and the lead wires.

Many minor objects will be made clear or become apparent during the course of the following specification, reference being had to the accompanying drawing, wherein:

Fig. 1 is a side elevational view of an electrical extension cord assembly made in accordance with my present invention, parts being broken away for clearness.

Fig. 2 is a cross sectional view taken on line II—II of Fig. 1.

Fig. 3 is a plan view of the outermost face of one of the reel discs; and

Fig. 4 is a fragmentary cross sectional view taken on line IV—IV of Fig. 2.

In the drawings, a body generally designated by the numeral 10 and molded or otherwise formed from a relatively light material such as plastic, is cup-shaped to present a normally back wall 12 and a circular side wall 14 projecting laterally from one face of wall 12.

A covering plate 16 is secured to the outermost annular edge of wall 14 through the medium of a number of screws or the like 18.

A reel generally designated by the numeral 20, comprises a hub 22 and a pair of spaced apart discs 24 integral with hub 22. These discs 24 are substantially parallel and spaced apart a distance substantially equal to the width of a conventional extension cord 26. A shaft 28 is journaled within an opening 30 formed in the plate 16 and has a dome-shaped head 32 on the normally innermost end thereof received by a similarly shaped cavity 34 within the wall 12 of body 10. This shaft 28 receives the hub 22 of reel 20 as illustrated in Fig. 2 and a nut 36 is threaded upon shaft 28 to tightly hold hub 22 against shoulder 38 of shaft 28.

A cavity 40 circumscribing the opening 30 is formed within the plate 16 to provide a clearance for the nut 36. The distance between shoulder 38 and head 32 is greater than the depth of the cavity 34 within wall 12 to present a space 42 between the innermost face of wall 12 and the proximal disc 24 and to hold the opposite disc 24 in frictional engagement with the innermost face of the plate 16.

One end of the cord 26 extends through an opening 44 within the wall 14 of body 10 and has a conventional plug 46 on the free end thereof. The opposite end of the two wires forming the cord 26 extend through the normally innermost disc 24 of reel 20 to join with a pair of circular plates 48 and 50 on this disc 24. These discs 48 and 50 are concentric with the shaft 28 and are formed from any suitable material capable of conducting electrical current. A pair of lines 52 adapted to be connected with an electrical appliance with which the assembly is to be used, are molded within the wall 12, of body 10 as clearly illustrated in Fig. 2 and have their ends extending into body 10 and joining with a pair of resilient clips 54 respectively. These clips 54 are interposed within the space 42 between wall 12 and reel 20 as are a pair of knobs 56 secured to the innermost face of wall 12 to balance the reel 20 as the latter is rotated by manipulation of a knob 58 secured to the outermost end of shaft 28 extending beyond the plate 16.

It is clear from the foregoing that as the reel 22 is caused to be rotated in either direction, the clips 54 will each continually wipe against a respective one of the circular plates 48 and 50 and establish continuous electrical connection between the lines 52 and the cord 26 since these clips 54 are also of material capable of conducting electrical energy. Obviously, the body 10, as well as the reel 20, should be formed of non-conducting material and the wall 12 of body 10 is provided with a pair of perforated extensions 60 for receiving means to fasten the entire assembly upon the appliance with which the same is used.

One of the users for which the assembly just described is designed is with a radio, the knob 58 simulating in appearance and size the usual knobs forming a part of such radio. The lines 52 are connected to the electrical mechanism of the radio and plug 46 is inserted into the conventional electrical outlet. When it is desired to move the radio, the cord 26 will be pulled to an extended condition as reel 20 freely rotates within the body 10. When the radio is replaced to a position nearer the outlet, cord 26 may be rewound upon the reel 20 within the body 10 by simply manipulating the knob 58. When the excess length of the cord 26 is wound upon the hub 22 of reel 20, the frictional engagement between the plate 16 and the proximal disc 24 will maintain the cord 26 in the wound condition.

Obviously, the assembly may be mounted upon virtually any type of electrical appliance other than radios and when such is done, all undesirable and unsightly excess lengths of the cord 26 will be completely housed within the body 10 at all times and until the user wishes to move such appliance to points remote from the outlet receiving plug 46.

While only one form of my invention has been disclosed and above described, it is to be understood that changes and modifications may be made particularly in purely structural details without departing from the spirit of this invention or scope of the appended claim.

Having thus described the invention, what is claimed as new and desired to be secured by Letters Patent is:

An electrical extension cord assembly comprising a hollow body having an inlet opening; a reel rotatably mounted within said body for receiving an extension cord in wound relation thereabout; lead lines attached to the body and adapted for connection to an electrical appliance or the like, said lead lines terminating at one end thereof within said body adjacent the reel; means for maintaining continuous electrical connection between the lead lines and one end of the extension cord as the reel is rotated, said reel comprising a hub and a pair of discs mounted on the hub in parallel, spaced relation, said extension cord being wound about the hub between said discs, said means comprising electrical contact elements on the innermost face of one wall of the body and on the proximal disc of the reel respectively; and means for holding said proximal disc spaced from said one wall, the electrical contact elements on the body comprising resilient clips wedged in said space between the body and the reel in frictional sliding engagement with the electrical elements on the reel, whereby the opposite disc of said reel is held in frictional engagement with the opposite wall of the body.

ROY M. STRIEGEL.

REFERENCES CITED

The following references are of record in the file of this patent:

UNITED STATES PATENTS

| Number | Name | Date |
|---|---|---|
| 737,659 | Pitel | Sept. 1, 1903 |
| 2,306,611 | Benjamin | Dec. 29, 1942 |